United States Patent
Laitila et al.

(10) Patent No.: US 9,019,923 B2
(45) Date of Patent: Apr. 28, 2015

(54) NETWORK DEVICES AND METHOD FOR SUPPORTING DOWNLINK PAGING FOR LIPA OR SIPTO

(75) Inventors: Matti Einari Laitila, Oulu (FI); Seppo Ilmari Vesterinen, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 173 days.

(21) Appl. No.: 13/817,927

(22) PCT Filed: Aug. 24, 2010

(86) PCT No.: PCT/EP2010/062347
§ 371 (c)(1),
(2), (4) Date: Feb. 20, 2013

(87) PCT Pub. No.: WO2012/025149
PCT Pub. Date: Mar. 1, 2012

(65) Prior Publication Data
US 2013/0148621 A1    Jun. 13, 2013

(51) Int. Cl.
*H04W 4/00* (2009.01)
*H04W 68/00* (2009.01)
*H04W 84/04* (2009.01)
*H04W 92/02* (2009.01)

(52) U.S. Cl.
CPC ............ *H04W 68/005* (2013.01); *H04W 68/00* (2013.01); *H04W 84/045* (2013.01); *H04W 92/02* (2013.01)

(58) Field of Classification Search
CPC ..... H04W 80/04; H04W 88/06; H04W 28/04; H04W 72/04

USPC .................................................. 370/328, 329
See application file for complete search history.

(56) References Cited

FOREIGN PATENT DOCUMENTS

| EP | 2151136 | 2/2010 |
|---|---|---|
| WO | WO 2008/132163 A1 | 11/2008 |
| WO | WO 2010/102652 A1 | 9/2010 |
| WO | WO 2010/127683 A1 | 11/2010 |

OTHER PUBLICATIONS

International Search Report and Written Opinion dated May 10, 2011 corresponding to International Patent Application No. PCT/EP2010/062347.

(Continued)

*Primary Examiner* — Ronald B Abelson
(74) *Attorney, Agent, or Firm* — Squire Patton Boggs (US) LLP

(57) ABSTRACT

A method for supporting downlink paging for LIPA or SIPTO while a first UE has been moved to an idle mode may include monitoring UE traffic while the first UE is in the active state and storing a UE IP address for a default EPS bearer of the first UE in a node and in a gateway for LIPA or SIPTO service. A downlink datagram for paging activation is sent towards the first UE over an existing tunnel, wherein the tunnel was established for a second UE being in an active state, wherein the tunnel may be established for the second UE or any other UE served by the same node and the same gateway, and activating a paging procedure by receiving the downlink datagram via the tunnel in a gateway, which gateway is serving the first UE for the default EPS bearer service of the first UE.

12 Claims, 3 Drawing Sheets

(56) References Cited

OTHER PUBLICATIONS

"3rd Generation Partnership Project; Technical Specification Group Services and System Aspects; Local IP Access and Selected IP Traffic Offload (Release 10)," 3GPP Standard; 3GPP 23.829 V1.1.0, May 28, 2010, pp. 1-44, XP050441475.

"3rd Generation Parntership Project; Technical Specification Group Services and System Aspects; 3GPP System Architecture Evolution: GPRS enhancements for E-UTRAN access; Release 8," 3GPP Standard; 3GPP TS 23.401 V0.4.1, Apr. 1, 2007, pp. 1-41, XP050363646.

Motorola et al., "LIPA Solution-1, Stand-alone L-GW with Sxx being both user-plane and control-plane," 3GPP Draft, S2-102433; 3GPP TSG SA WG2 Meeting #79, May 4, 2010, XP050434593, 9 pages.

China Mobile, "Paging Support for Solution 2," 3GPP Draft; TD S2-102365; 3GPP TSG SA WG2 Meeting #79, May 4, 2010, XP050434538, 4 pages.

LG Electronics et al, "Call flows for LIPA Solution 1 Variant 1 with collocated H(e)NB and L-GW," 3GPP Draft; TD S2-102492, 3GPP TSG SA WG2 Meeting #79, May 4, 2010, XP050434638, 6 pages.

"3rd Generation Partnership Project; Technical Specification Group Services and System Aspects; Service aspects; Service Principles (Release 10)," 3GPP Standard; 3GPP TS 22.101 V10.3.0, Jun. 16, 2010, pp. 1-60, XP050441776.

"3rd Generation Partnership Project; Technical Specification Group Radio Access Network; Evolved Universal Terrestrial Radio Access Network (E-UTRAN); S1 Application Protocol (S1AP) (Release 9)," 3GPP Standard; 3GPP TS 36.413 V9.3.0, Jun. 14, 2010, pp. 1-241, XP050441721.

"3rd Generation Partnership Project; Technical Specification Group Services and System Aspects; Service Requirements for Home Node B (HNB) and Home eNode B (HeNB) (Release 10)," 3GPP Standard; 3GPP TS 22.220 V10.3.0, Jun. 16, 2010, pp. 1-25, XP050441778.

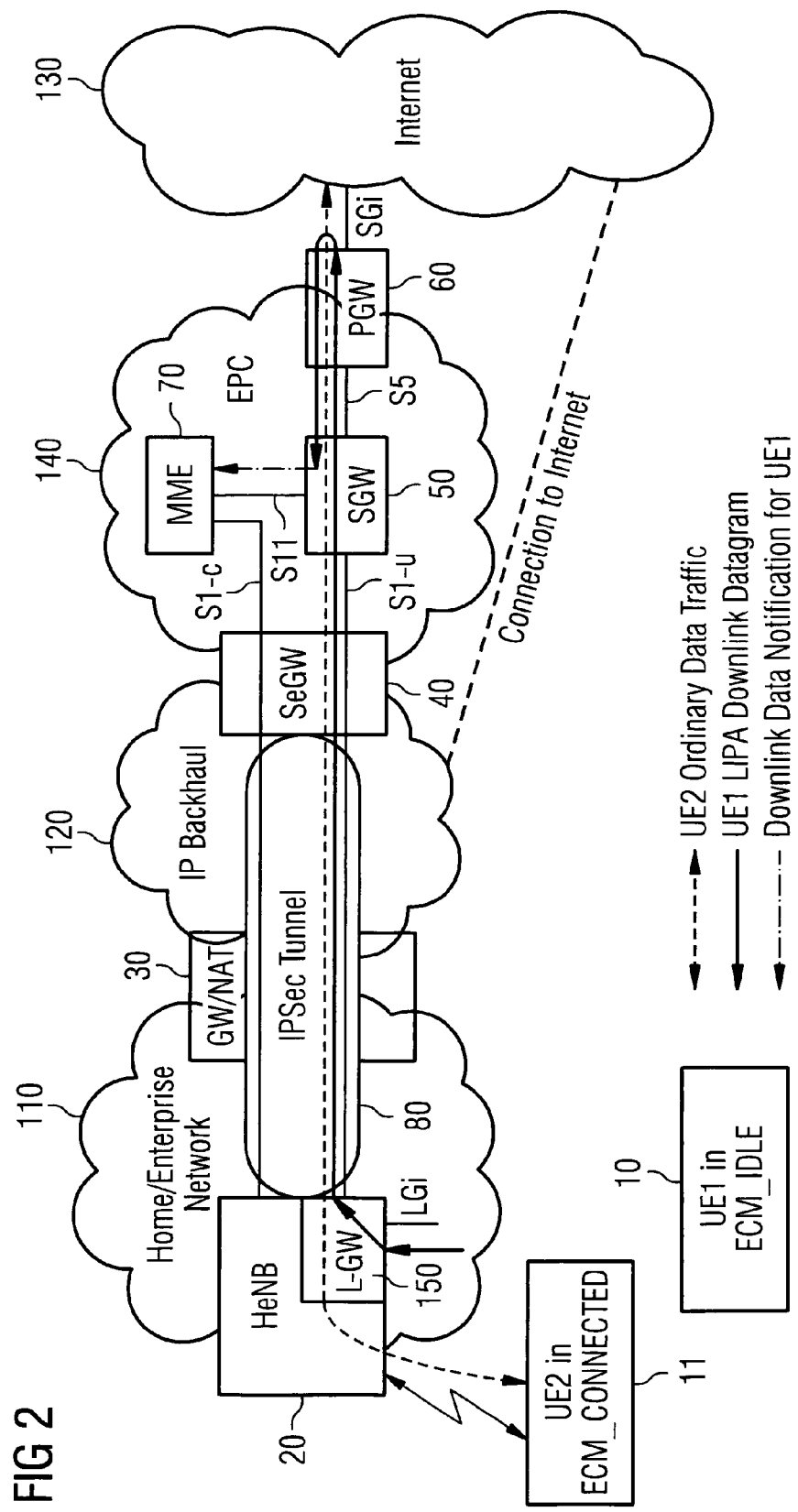

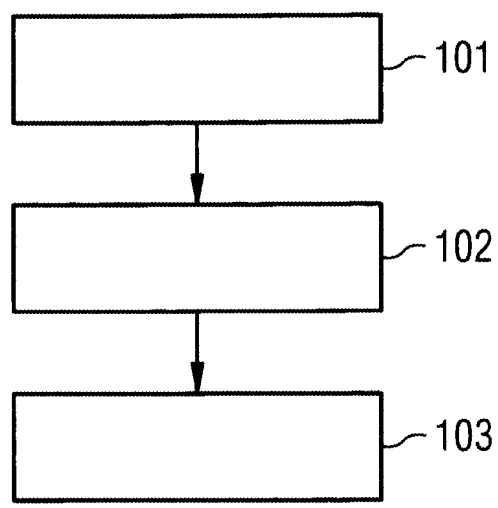

US 9,019,923 B2

NETWORK DEVICES AND METHOD FOR SUPPORTING DOWNLINK PAGING FOR LIPA OR SIPTO

TECHNICAL FIELD

The invention relates to communication networks. Embodiments of the present invention relate generally to mobile communications and more particularly to network devices and methods in communications networks. The invention relates network devices and to a method for supporting downlink paging for LIPA or SIPTO. Moreover, the invention relates to devices within a network, to a computer program product and to a computer-readable medium.

BACKGROUND

Networks are based on architectures which may be under development. 3GPP is one group which develops networks worldwide and provides standards for communication networks and devices within the networks.

In the current standardization activities of 3GPP there is a work ongoing in the working group SA2 WG for Support of Local IP access (LIPA) for the Home (e)NodeB Subsystem and of Selected IP traffic offload (SIPTO) for the Home (e)NodeB Subsystem and for the macro layer network may be required in TS 22.220 and TS 22.101.

The working group is specifying the TR 23.829 for LIPA and SIPTO and there the downlink paging support for LIPA may be currently an open issue to be solved in the so called "solution proposals 1 and 2".

The current LIPA/SIPTO Architecture comprising different embodiments, i.e. "solution proposals 1 and 6" in the standardization document TR 23.829 may necessitate termination of an additional core network interface to the (H)eNB collocated L-GW for LIPA Bearer Service management.

This core network interface may be S11-like interface from MME to the (H)eNB/L-GW in the variant where L-GW is modeled as a local S-GW/P-GW, or S5-like interface when L-GW is modeled as a local P-GW.

The "solution proposal 6" may assume specifying a new "extension tunnel" from P-GW to the (H)eNB/L-GW.

"Solution proposal 2" in the TR 23.829 may assume that the L-GW function for LIPA service will not have any additional control interface to the already existing S1-MME between EUTRAN and EPC (Core Network).

The ordinary paging trigger upon arriving downlink packet to the S-GW may not be applied as LIPA traffic does not traverse via the Core Network nodes. Thus some further mechanism may be needed for initiating the UE paging with LIPA services.

It may be foreseen in relation to solution 2 that "downlink paging support for LIPA requires special mechanism that may be problematic, e.g. tunnel traffic over Internet to PGW/GGSN". This is because the PGW/GGSN may not be reachable via the Internet (could be behind a NAT function or a Firewall).

Further proposals may use only the S1-MME interface for all LIPA control. Again here the "downlink paging support for LIPA can be considered open issue as it would need changes to the S1AP protocol in 3GPP.

It may also be foreseen a LIPA/SIPTO architecture where the L-GW is implemented with Core Network GWs (S-GW and P-GW) that are just moved close to (H)eNB or collocated with (H)eNB. In this case the standard procedures for paging can be used as the S-GW behaves as paging agent and has S11 (or L-S11) interface to the MME for triggering paging as usual.

However, this kind of a solution may be not suitable for simple LIPA access from HeNBs, since it may break the clear RAN—Core split and would necessitate storing sensitive User Context e.g. IMSI in the HeNB/L-GW node installed to customer premises (untrusted from MNO point of view) etc.

There may be further approaches for supporting more optimized paging trigger from (H)eNB/L-GW to the MME.

In the content of WO2008/132163 there may be assumed that (H)eNB/L-GW has a local Paging Agent that can generate a paging command message and send it locally to all (H)eNBs in the Tracking Area providing LIPA (Local Breakout) Service. This method has a disadvantage that it requires the local Paging Agent to emulate MME in the EPC as the originator of the paging command in order to avoid changes in the UEs.

Moreover, further solutions in relation to paging and managed remote access in Local IP breakout may assume that the (H)eNB collocated L-GW has a S5-like interface to the S-GW placed in the EPC through which the L-GW sends uplink data packet that further triggers paging in the S-GW and MME as usual. This method has a disadvantage that an additional core network interface must be terminated in EUTRAN node and the L-GW should implement 3GPP proprietary P-GW functions for simple IP traffic bridging between local network and data radio bearer in (H)eNB.

In addition, further solutions in relation to optimized interface for Local IP Access may assume that only S1-MME interface will be needed for controlling LIPA feature in HeNB collocated L-GW that implements a local Paging Agent function that sends a new control message to the MME over S1-MME interface to trigger UE paging via MME. This method has disadvantage that upon UE movement to the Idle-mode the UE specific S1AP connection is released so a common S1AP elementary procedure from (H)eNB to MME should be used.

There may be a need for a solution for a downlink paging support for LIPA services.

SUMMARY OF THE INVENTION

According to an exemplary embodiment of the present invention there may be provided a method for supporting downlink paging for LIPA or SIPTO while a first UE using LIPA or SIPTO service has been moved to an idle mode. The method may comprise monitoring UE traffic while the first UE is in the active state and storing a UE IP address for a default EPS bearer of the first UE in a node and in a gateway for LIPA or SIPTO service. Moreover, the method may comprise sending a downlink datagram for paging activation towards the first UE over an existing tunnel, wherein the tunnel may have been established for a second UE being in an active state, wherein the tunnel may be established for the second UE or any other UE served by the same node and the same gateway, and activating a paging procedure by receiving the downlink datagram via the tunnel in a gateway, which gateway may be serving the first UE for the default EPS bearer service of the first UE.

Local IP address (LIPA) may be understood as the ability for an IP-enabled device to access a consumer's home-based local area network as well as the broader internet directly using an air interface of a home nodeB (HNB) and a local gateway (L-GW).

A paging procedure may be understood as a procedure by which a mobile network attempts to reach the mobile station (MS) or a mobile subscriber within its location area, before any other network-initiated procedure can take place The existing tunnel may be in an operator domain. The node may be a RAN node. The gateway may be a local gateway. Local means that the location of the gateway is close to the UE. The local gateway may be a PGW or a GGSN like logical entity.

When the L-GW is collocated with the (H)eNB this application for LIPA/SIPTO paging can be implemented simply in the (H)eNB SW i.e. at the EUTRAN level without any changes in the EPC nodes, or being visible to the UEs. In case the proposed enhancements for the S1AP protocol will be applied then this will need implementation also in the MME.

When existing solutions like solutions in relation to optimized interface for Local IP Access (S1-MME) may be combined with this present proposal where it is proposed to use a S1-U tunnel for any user in the ECM-CONNECTED state to deliver the downlink datagram to the paged UE, it could avoid termination of additional core network or new interfaces in the (H)eNB collocated L-GW for LIPA/SIPTO Services.

The L-GW may be a bridging function between the data radio bearer and the local IP network instead of a subset of core network nodes S-GW and P-GW. Also the "solution proposal 2" in the TR 23.829 would be supported where the L-GW implements NAT function for routing LIPA traffic using just a Single APN in the UE. The solution 2 with NAT based L-GW may be selected as one option for LIPA in 3GPP.

According to an exemplary embodiment of the present invention the method may further comprise receiving the IP address by monitoring user data traffic over the default EPS Bearer of the UE and capturing the source IP address in uplink packets and/or the destination address in a downlink packet.

According to an exemplary embodiment of the present invention the method may further comprise receiving the IP address in a LIPA Bearer Setup procedure by adding an Information Element in a protocol.

The protocol may be a S1AP, which is protocol that comprises of a set of commands and processes used to manage communication between the evolved node B and the evolved packet core network elements. A S1 application protocol may be used between the evolved node B and mobility management entity. The information element may inside an E-RAB Setup Request message from the MME.

According to an exemplary embodiment of the present invention the method may further comprise receiving the IP address in the LIPA Bearer Modification procedure by adding an Information Element in a protocol.

The protocol may be a S1AP. The information element may inside an E-RAB Setup Request message from the MME.

According to an exemplary embodiment of the present invention the method may further comprise receiving the IP address in a S1 Release procedure by adding an Information Element in a protocol.

The protocol may be a S1AP. The information element may inside a UE Context Release Request message from the MME.

According to an exemplary embodiment of the present invention the method may further comprise requesting a S1-U uplink tunneling parameters for any active EPS Bearer and UE in ECM-CONNECTED state from its collocated (H)eNB and creating a S1-U GTP-packet where the said datagram to the first paged UE is encapsulated.

The tunneling parameters may be a S-GW Transport Address and/or a TEID.

According to an exemplary embodiment of the present invention the method may further comprise selecting the utilized EPS Bearer where the Paging Agent/L-GW given S-GW Transport Address may match to ensure that a P-GW for the first paged UE is reachable from a S-GW.

According to an exemplary embodiment of the present invention the method may further comprise selecting the utilized EPS Bearer where the Paging Agent/L-GW given S-GW Transport.

According to an exemplary embodiment of the present invention the method may further comprise sending the datagram to the EPC or MNO domain over a IPSec connection in order to protect interfaces.

The interfaces may be at least one of the interfaces S1-MME, S1-U and Operation and Maintenance (O&M) interfaces. The IPSec connection may be provided within an existing tunnel.

According to an exemplary embodiment of the present invention the method may further comprise sending the datagram to the P-GW located in the EPC without any tunnelling in cases where the (H)eNB may be connected to MNO domain and transport network and there are no active EPS bearers.

The (H)eNB may be connected to MNO domain and transport network, i.e. installed to Operator's site. The transport network may be for example installed to Operator's site.

According to an exemplary embodiment of the present invention the method may further comprise after decapsulating the datagram, routing the datagram according to the following criteria: sending the datagram to the default EPS Bearer of the UE over the S5 interface or sending the datagram to the SGi Interface in case some other P-GW is serving the paged UE.

It may be foreseen sending the datagram to the default EPS Bearer of the UE (10) over the S5 interface, i.e. downlink packet destined to the S-GW serving the paged UE in case the P-GW itself is the serving the paged UE, for example an IP address match.

According to an exemplary embodiment of the present invention there may be provided a network device for supporting downlink paging for LIPA or SIPTO while a UE using LIPA/SIPTO Service has been moved to an idle mode. The network device may comprise a paging agent function, which may be adapted to store an IP address of a default EPS Bearer of a UE in a L-GW context data, a receiving unit for receiving the IP address for the default EPS Bearer of the UE and a memory for storing the S-GW transport Layer Address for the UEs default Bearer in the L-GW context data.

The paging agent function may be a local paging agent function.

According to an exemplary embodiment of the present invention the network device may be one of the group consisting of a paging agent, a gateway, a local GW, a node, an Evolved Node B, a gateway comprising a paging agent and a node comprising a paging agent.

According to an exemplary embodiment of the present invention there may be provided a computer program product comprising code portions for causing a network device on which the computer program is executed, to carry out the method according to any of the embodiments of the present invention.

According to an exemplary embodiment of the present invention there may be provided a computer-readable medium embodying the computer program product, wherein the computer program product may comprise code portions for causing a network device, on which the computer program may be executed to carry out the method according to an exemplary embodiment of the present invention.

A computer-readable medium may comprise a computer-readable storage medium that may be any media or means that can contain or store the instructions for use by or in connection with an instruction execution system, apparatus, or device, such as a computer.

BRIEF DESCRIPTION OF THE DRAWINGS

Embodiments of the present invention are described below with reference to the accompanying drawings, which are not necessary drawn to scale, wherein:

FIG. 2 illustrates an exemplary LIPA Downlink datagram routing for paging diagram according to the present invention;

FIG. 3 illustrates an exemplary embodiment of a method according to the present invention.

DETAILED DESCRIPTION

Figure 1:
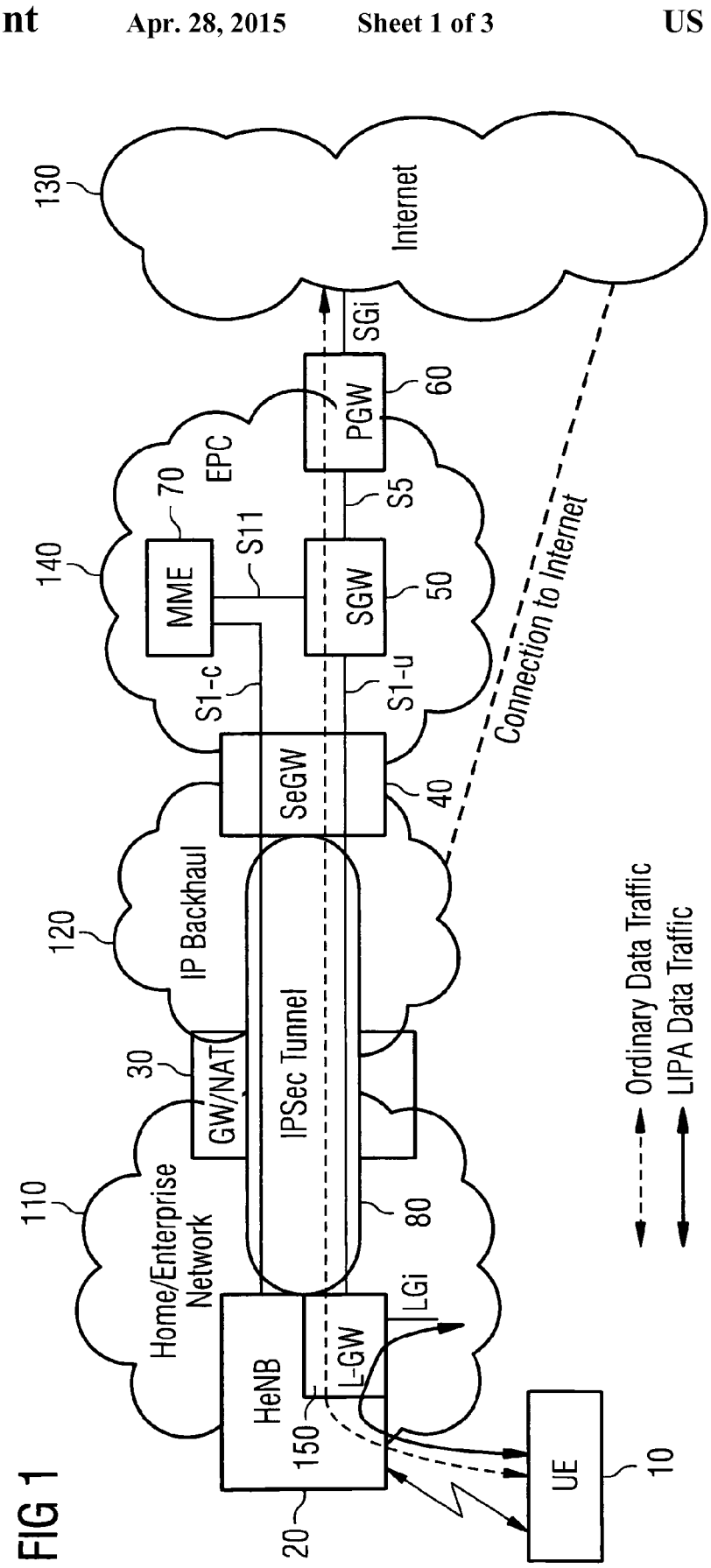
FIG. 1 illustrates an exemplary architecture within a 3GPP environment.

The illustration of the drawings is schematic.

FIG. 1 illustrates an exemplary architecture within a 3GPP environment. A user equipment (UE) 10 may be wirelessly connected to a home/enterprise network 110 comprising a home nodeB ((H)eNB or HeNB or home eNB) 20. The HeNB may comprise a L-GW 150 with an NAT function block and a routing function block. Moreover, the HeNB 20 may be connected to a SeGW 40 over a tunnel 80, wherein the tunnel 80 may connect the home/enterprise network 110 with an IP backhaul 120. The home/enterprise network 110 may comprise a residential gateway with an NAT function 30 connected to the IP backhaul 120. The IP backhaul 120 may have access or may be connected to the internet 130. The SeGW 40 may be connected to an EPC (evolved packet core) network 140, which may comprise an SGW 50, a PGW or P-GW 60, and an MME 70. Interfaces between network devices are indicated with S1-u (user-plane), S1-c (control plane), S11 and S5.

The L-GW 150 may be collocated with the HeNB 20 with routing and NAT functions. Moreover, the security gateway (SeGW) 40 may be located at the edge of an operator's core network. The role of the SeGW 40 may be to maintain a secure association with the HeNB 20 across an unsecure IP backhaul network 120. Moreover, the gateway/NAT device 30 may be located at the boundary of the home/enterprise IP network 110 and the IP backhaul network 120. The HeNB 20 may maintain an S1-u interface with the SGW 50 and an S1-c interface with the MME 70. The S1-c interface may provide a support for a HeNB-triggered paging.

FIG. 1 and FIG. 2 are based on exemplary embodiments of an architecture in a 3GPP environment, wherein similar or identical elements are provided with the same reference numerals. FIG. 2 illustrates an exemplary LIPA Downlink datagram routing for paging diagram according to the present invention. A first UE 10 may establish a LIPA enabled PDN connection by using a signalling procedure. The same PDN connection may be utilized for traffic between the first UE 10 and a packet data network and to the Internet via SGi interface and for traffic between the first UE 10 and the local home/enterprise network 110 via an LGi interface. The MME 70 may indicate to the HeNB 20 if LIPA may be enabled for the established bearer. The L-GW 150 may perform routing enforcement of uplink traffic. This routing enforcement may be transparent to the first UE 10 and may require no special UE 10 assistance. The routing decision may be based on brief configured LIPA routing rules. When a packet may arrive at the L-GW 150 and the first UE 10 may be in idle mode, the HeNB-triggered paging may be invoked by sending a special message to the MME 70.

In FIG. 2 the first UE 10 (UE1) is illustrated in an idle state, especially in an ECM idle state/ECM-IDLE mode. A second UE 11 (UE2) is illustrated in an active mode, especially in an ECM connected state. In the following exemplary embodiments are given in order to page the first UE 10.

In order to support "downlink paging for LIPA" or for SIPTO at EUTRAN level with minimal changes in the EUTRAN—EPC interfaces while the first UE 10 using LIPA/SIPTO Service has been moved to ECM-IDLE mode it is proposed that the (H)eNB/L-GW may implement the following:

A local Paging Agent function that may store the IP address for UE's default EPS Bearer in the L-GW context data. The (H)eNB/L-GW may get the IP address for UE's default EPS Bearer with some of the following alternatives:

According to an exemplary embodiment: By monitoring user data traffic over the UE's default EPS Bearer and capturing either the source IP address in uplink packets, or the destination address in the downlink packets.

According to an exemplary embodiment: In the LIPA Bearer Setup procedure, for example as defined in TS 36.413, by adding a new Information Element in the S1AP: E-RAB Setup Request message from the MME.

According to an exemplary embodiment: In the LIPA Bearer Modification procedure, for example according to TS 36.413, by adding a new Information Element in the S1AP: E-RAB Setup Request message from the MME, according to an exemplary embodiment.

According to an exemplary embodiment: In the S1 Release procedure, for example according to the S1 Release procedure as defined in TS 23.401, by adding a new Information Element in the S1AP: UE Context Release Request message from the MME, for example in an UE Context Release Request message as defined in TS 36.413.

A local Paging Agent function that may store the S-GW Transport Layer Address for the UE's default EPS Bearer in a L-GW context data.

The (H)eNB 20 may have the S-GW Transport Layer Address for the UE's default EPS Bearer stored in the eNB UE context data as one of the S1-U tunnel parameters. However, when the UE 10 is moved to the ECM-IDLE mode by using the S1 Release procedure, for example according to TS 23.401 the eNB UE context may become deleted in the (H)eNB 20, so it is proposed to store the eNB UE context also in the Paging Agent/L-GW context data that remains alive.

Upon reception of a downlink datagram to UE's IP address for LIPA Service the local Paging Agent/L-GW may create and send any proper datagram to the P-GW 60 in the EPC 140 with IP address for UE's default EPS Bearer as a destination address and (H)eNB/L-GW IP address as a source address. This may be performed with some of the following alternatives:

According to an exemplary embodiment: The Paging Agent/L-GW may request the S1-U uplink tunneling parameters (S-GW Transport Address and TEID) for any active EPS Bearer and UE in ECM-CONNECTED state of a second UE 11 from its collocated (H)eNB and may create S1-U GTP-packet where the said datagram to the paged UE is encapsulated.

According to an exemplary embodiment: The (H)eNB 20 may select the used EPS Bearer where the Paging Agent/L-GW given S-GW Transport Address match to ensure that P-GW 60 for the paged UE is reachable from the S-GW 50.

According to an exemplary embodiment: For the cases when there are no active EPS bearers in the (H)eNB 20 then the L-GW 150 may send the said datagram to the EPC 140 (Evolved Packet Core or Mobile Network Operator domain) over the IPSec connection within the tunnel 80 that may be mandatory for the HeNBs in order to protect the S1-MME, S1-U and O&M interfaces. Now this datagram may be traffic inside the Mobile Network Operator (MNO) domain, so the datagram may have a better opportunity to become routed to the correct P-GW 60 that is serving the UE 10.

According to an exemplary embodiment: In cases where the (H)eNB 20 is connected to MNO domain and transport network (i.e. installed to Operator's site) and there are no active EPS bearers then the L-GW 150 may send the said datagram to the P-GW 60 located in the EPC 140 without any tunneling.

Upon reception of this S1-U GTP-packet the S-GW 50 may forward it as a S5-U packet to the P-GW 60 associated to the used EPS Bearer.

Upon reception of the S5-U packet the P-GW 60 may decapsulate the datagram destined to the paged UE 10 and routes as follows:

When the P-GW 60 itself is the serving the paged UE 10 (IP address match) then the P-GW sends the datagram to the UE's default EPS Bearer over the S5 interface i.e. downlink packet destined to the S-GW 50 serving the paged UE 10.

When some other P-GW 60 is serving the paged UE 10 then the P-GW 60 may send the datagram to the SGi Interface. Now the network may route it to the correct P-GW 60 serving the UE 10 that forwards it further to the UE's default EPS Bearer over the S5 interface.

Upon reception of the S5-U downlink packet the S-GW detects that UE is in ECM-IDLE and sends a S11: Downlink Data Notification message to the MME 70 like specified for example in the TS 23.401 for a Network Triggered Service Request procedure.

Finally the MME 70 may perform the UE paging for the UE 10.

Thus, it may be foreseen to monitor UE traffic for its default bearer to resolve its IP address assigned from the PGW/GGSN by using IP lookup, for example by reading the source address in uplink and/or destination address in downlink. A RAN (Radio Access Network) node (RNC or (H)eNB) may not read user IP datagrams that are carried as the payload in the GTP based tunnels in Iu-u or S1-u interfaces as the GTP-header may comprise UE Bearer specific identifiers for mapping traffic to its corresponding Radio Bearer Service over the radio interface.

It may be foreseen, that the HeNB 20 may select the used EPS bearer where the paging agent/L-GW given S-GW transport address may match to ensure that P-GW 60 for the paged UE 10 may be reachable from the S-GW 50.

Moreover, when some other P-GW may serve or may be serving the paged UE, then the PGW may send the datagram to the SGi interface. Then the network may route the datagram to the correct P-GW serving the UE 10 that forwards it further to the UE/S default EPS bearer over the S5-interface.

FIG. 3 illustrates an exemplary embodiment of a method according to the present invention. The method may be utilized for supporting downlink paging for LIPA or SIPTO while a first UE using LIPA or SIPTO service has been moved to an idle mode. The method may comprise monitoring UE traffic while the first UE is in the active state and storing a UE IP address for a default EPS bearer of the first UE in a node and in a gateway for LIPA or SIPTO service, in box 101.

Moreover, the method may comprise sending a downlink datagram for paging activation towards the first UE over an existing tunnel, wherein the tunnel may have been established for a second UE being in an active state, wherein the tunnel may be established for the second UE or any other UE served by the same node and the same gateway, in box 102.

In addition the method may comprise activating a paging procedure by receiving the downlink datagram via the tunnel in a gateway, which gateway may be serving the first UE for the default EPS bearer service of the first UE, in box 103.

Exemplary embodiments have been described for 3GPP technology. Similar solutions may be utilized in LTE technology, which is in particular a 3GPP technology, or in similar technologies.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

The network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

For the purpose of the present invention as described herein above, it should be noted that:

an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although described above mainly with respect to methods, procedures, an apparatus and modules thereof, it is to be understood that the present invention also covers a computer program products for implementing such methods or procedures and/or for operating such apparatuses or modules, as well as computer-readable (storage) media for storing such computer program products. The present invention also covers any conceivable combination of method steps and operations described above, and any conceivable combination of nodes, apparatuses and modules described above, as long as the above-described concepts of methodology and structural arrangement are applicable.

Furthermore, the network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

In this context, "first", "second", "third", etc. in relation to devices or network devices or interfaces or security data may not be understood as hierarchy, it should be understood only to distinguish different devices or interfaces from each other.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

It should be noted, that reference signs in the claims shall not be construed as limiting the scope of the claims.

In this context, "first", "second", "third", etc. in relation to devices, network devices, interfaces, messages, etc. may not be understood as hierarchy, it should be understood only to distinguish different devices or interfaces or messages, etc. from each other.

LIST OF ABBREVIATIONS

APN=Access Point Name
eNB=Evolved Node B
EPC=Evolved Packet Core
EPS=Evolved Packet System
E-RAB=Evolved Radio Access Bearer
EUTRAN=Evolved UTRAN
GGSN=Gateway GPRS Support Node
GTP=GPRS Tunneling Protocol
HNB=Home nodeB
HeNB=Home eNB
HNB=Home Node B (for 3G radio access)
IMSI=International Mobile Subscriber Identifier
LIPA=Local IP Access
L-GW=Local GW
LGi=Local GW to Local Network Interface
MME=Mobility Management Entity
MNO=Mobile Network Operator
NAT=Network Address Translation
P-GW=PDN GW
RAN=Radio Access Network
S-GW=Serving GateWay
SGi=P-GW to External Networks Interface
SIPTO=Selected IP Traffic Offload
TEID=Tunnel Endpoint Identifier
UE=User Equipment
UE1=first UE
UE2=second UE

The invention claimed is:

1. Method for supporting downlink paging for LIPA or SIPTO while a first UE using LIPA or SIPTO service has been moved to an idle mode, the method comprising:
   monitoring UE traffic while the first UE is in the active state and
   storing a UE IP address for a default EPS bearer of the first UE in a node and in a gateway for LIPA or SIPTO service,
   sending a downlink datagram for paging activation towards the first UE over an existing tunnel, wherein the tunnel was established for a second UE being in an active state, wherein the tunnel is established for the second UE or any other UE served by the same node and the same gateway,
   activating a paging procedure by receiving the downlink datagram via the tunnel in a gateway, which gateway is serving the first UE for the default EPS bearer service of the first UE, and
   receiving the IP address in one of an LIPA Bearer Setup procedure, an LIPA Bearer Modification procedure, and an S1 Release procedure, by adding an Information Element in a protocol.

2. Method according to claim 1, wherein the method further comprises
   receiving the IP address by monitoring user data traffic over the default EPS Bearer of the first UE and capturing the source IP address in uplink packets and/or the destination address in a downlink packet.

3. Method according to claim 1, wherein the method further comprises
   requesting a S1-U uplink tunneling parameters for an active EPS Bearer and for the second UE in ECM-CONNECTED state from its collocated (H)eNB and
   creating a S1-U GTP-packet where the said datagram to the paged first UE is encapsulated.

4. Method according to claim 1, wherein the method further comprises selecting the utilized EPS Bearer where the Paging Agent/L-GW given S-GW Transport Address match to ensure that a P-GW for the paged first UE is reachable from the a S-GW.

5. Method according to claim 1, wherein the method further comprises selecting the utilized EPS Bearer where the Paging Agent/L-GW given S-GW Transport.

6. Method according to claim 1, wherein the method further comprises
   sending the datagram to the Evolved Packet Core over an IPSec connection in order to protect interfaces.

7. Method according to claim 1, wherein the method further comprises
   sending the datagram to the P-GW located in the Evolved Packet Core without any tunneling in cases where the (H)eNB is connected to the Mobile Network Operator domain and transport network and there are no active Evolved Packet System bearers.

8. Method according to claim 1, wherein the method further comprises after decapsulating the datagram, routing the datagram according to the following criteria: sending the datagram to the default EPS Bearer of the first UE over a S5 interface or sending the datagram to a SGi Interface in case some other P-GW is serving the paged UE.

9. Computer program product comprising code portions for causing a network device, on which the computer program is executed, to carry out the method according to claim 1.

10. Computer-readable medium embodying the computer program product according to claim 9.

11. Network device for supporting downlink paging for LIPA or SIPTO while a first UE using LIPA or SIPTO service has been moved to an idle mode, the network device comprising:
    a paging agent function, which is adapted to store an IP address of a default EPS Bearer of a UE in a L-GW context data;
    a receiving unit for receiving the IP address for the default EPS Bearer of the UE; and
    a memory for storing the S-GW transport Layer Address for the UEs default Bearer in the L-GW context data;
    wherein the receiving unit for receiving the IP address is configured to receive the IP address in one of an LIPA Bearer Setup procedure, an LIPA Bearer Modification procedure, and an S1 Release procedure, by adding an Information Element in a protocol.

12. Network device according to claim 11, wherein the network device is one of the group consisting of a paging agent, a gateway, a local GW, a node, an Evolved Node B, a gateway comprising a paging agent and a node comprising a paging agent.

* * * * *